F. A. Kursheedt,
Trimming.
No. 105,095.  Patented July 5, 1870.
 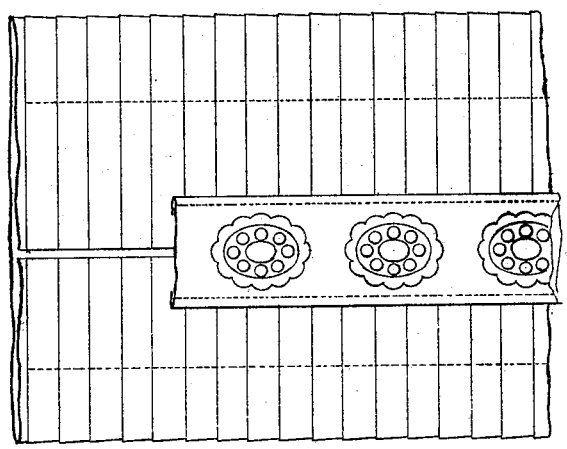
Witnesses:
Chas Jacobs
J. V. White
Inventor:
Fred. A. Kursheedt
per
T. H. Alexander
Atty.

United States Patent Office.

FREDERIC A. KURSHEEDT, OF NEW YORK, N. Y.

Letters Patent No. 105,095, dated July 5, 1870.

IMPROVEMENT IN PLAITED TRIMMINGS.

The Schedule referred to in these Letters Patent and making part of the same

*To all whom it may concern:*

Be it known that I, FREDERIC A. KURSHEEDT, of New York, in the county of New York and State of New York, have invented certain new and useful Improvements in the Method of Plaiting Trimmings; and I do hereby declare that the following is a full, clear, and exact description thereof, reference being had to the accompanying drawings, and to the letters of reference marked thereon, which form a part of this specification.

The nature of my invention consists in the construction of a new plaited trimming suitable for ladies' and children's wear, shirt-fronts, &c.

In order to enable others skilled in the art to which my invention appertains to make and use the same, I will now proceed to describe its construction, referring to the annexed drawings, in which—

Figure 1 is a view showing the fabric doubled on itself, the edges meeting on the face of the goods and covered with insertion.

The method of manufacturing this trimming is as follows:

The material is cut up lengthwise into long strips double the width desired for the finished article. Each strip is then folded lengthwise in such a manner that the edges meet on one face of the article.

The strips, after being thus folded, are to be plaited crosswise, either by hand or suitable mechanism, and afterward stitched lengthwise in one or more rows to keep the plaits in place.

The two open edges of the material are then covered by having a band or an insertion sewed over them.

The material may, if so desired, be folded in half, placing the open edges at one side, and binding or covering the same, as above mentioned.

It will be observed that the material of which the trimming is composed is used double instead of single. The advantages of my improvement are, that it dispenses with the necessity of hemming the edges, which hemming soon washes out, and interferes with the proper plaiting of the goods; and that the double thickness renders the article far stronger and more durable.

Having thus fully described my invention,

What I claim as new, and desire to secure by Letters Patent, is—

A plaited trimming made of a fabric folded upon itself, so as to be doubled, its edges meeting at any desired point on one face of the article, and being covered by a tape, insertion, or other suitable material, substantially as set forth.

In testimony that I claim the foregoing as my own, I affix my signature in presence of two witnesses.

FREDERIC A. KURSHEEDT.

Witnesses:
 THOMAS MILLER,
 I. B. KURSHEEDT.